(12) United States Patent
Helnerus et al.

(10) Patent No.: US 10,131,243 B2
(45) Date of Patent: Nov. 20, 2018

(54) METHOD AND DEVICE FOR IDENTIFYING AN ELECTRIC VEHICLE BY RECEIVING A CURRENT CONTRACT KEY IN AN ELECTRIC VEHICLE

(75) Inventors: Stefan Helnerus, Arnsberg (DE); Armin Gaul, Selm (DE)

(73) Assignee: innogy SE, Essen (DE)

( * ) Notice: Subject to any disclaimer, the term of this patent is extended or adjusted under 35 U.S.C. 154(b) by 1157 days.

(21) Appl. No.: 13/399,544

(22) Filed: Feb. 17, 2012

(65) Prior Publication Data
US 2012/0169282 A1 Jul. 5, 2012

Related U.S. Application Data

(63) Continuation of application No. PCT/EP2010/060582, filed on Jul. 21, 2010.

(30) Foreign Application Priority Data

Aug. 20, 2009 (DE) .................. 10 2009 037 968

(51) Int. Cl.
| | |
|---|---|
| *B60L 11/18* | (2006.01) |
| *G07F 15/00* | (2006.01) |
| *H02J 7/00* | (2006.01) |
| *G07F 17/00* | (2006.01) |

(52) U.S. Cl.
CPC ........ *B60L 11/1848* (2013.01); *G07F 15/003* (2013.01); *G07F 15/005* (2013.01); *G07F 17/0014* (2013.01); *H02J 7/0027* (2013.01); *H02J 2007/0001* (2013.01); *Y02T 90/169* (2013.01); *Y04S 30/14* (2013.01)

(58) Field of Classification Search
CPC .... Y02T 90/169; B60L 11/1848; Y04S 30/14; H02J 7/0027
USPC ......................................................... 320/109
See application file for complete search history.

(56) References Cited

U.S. PATENT DOCUMENTS

| | | | | |
|---|---|---|---|---|
| 2005/0075144 A1* | 4/2005 | Muramatsu | ............. | B60R 25/24 |
| | | | | 455/569.2 |
| 2008/0269953 A1* | 10/2008 | Steels | ................... | H02J 7/0004 |
| | | | | 700/295 |
| 2010/0161482 A1* | 6/2010 | Littrell | ............................ | 705/40 |
| 2011/0047595 A1* | 2/2011 | Diep et al. | ........................ | 726/3 |

FOREIGN PATENT DOCUMENTS

| | | |
|---|---|---|
| CN | 1164297 A | 11/1997 |
| CN | 101222333 A | 7/2008 |
| DE | 103 04 284 A1 | 8/2004 |
| DE | 10 2008 007 089 A1 | 8/2009 |
| TW | 313641 B | 8/1997 |
| TW | 348338 B | 12/1998 |

(Continued)

*Primary Examiner* — Richard Isla Rodas
*Assistant Examiner* — Manuel Hernandez
(74) *Attorney, Agent, or Firm* — Reinhart Boerner Van Deuren P.C.

(57) ABSTRACT

Method, device and system for charging electric vehicles. Carrying out 28 on the vehicle side a charging process at a charging station, emitting 30 on the vehicle side an item of information about the charging process and receiving 24 on the vehicle side a current contract key after the emission on the vehicle side of the information about the charging process are proposed for identifying an electric vehicle to a billing center.

18 Claims, 3 Drawing Sheets

(56) References Cited

FOREIGN PATENT DOCUMENTS

| | | |
|---|---|---|
| TW | I233720 B | 6/2005 |
| TW | M333710 U | 6/2008 |
| WO | WO 2009/052451 A2 | 4/2009 |

* cited by examiner

METHOD AND DEVICE FOR IDENTIFYING AN ELECTRIC VEHICLE BY RECEIVING A CURRENT CONTRACT KEY IN AN ELECTRIC VEHICLE

CROSS-REFERENCE TO RELATED PATENT APPLICATIONS

This patent application is a continuation of pending PCT Patent Application No. PCT/EP2010/060582, filed Jul. 21, 2010, which claims the benefit of German Application No. 102009037968.1, filed Aug. 20, 2009, the entire teachings and disclosure of which are incorporated herein by reference thereto.

FIELD OF THE INVENTION

The subject matter relates to a method for identifying an electric vehicle to a billing centre and also to a method for identifying an electric vehicle in a billing centre. In addition, the subject matter relates to a device for carrying out such a method and also to a system for carrying out such a method.

BACKGROUND OF THE INVENTION

The distribution of electrically operated vehicles looks set to increase rapidly in the near future. However, as electric vehicles which are operated using an electric motor become more widespread, steps should be taken to ensure that the vehicles can be supplied with energy in the simplest manner. A functioning infrastructure should be provided for this purpose.

In particular, the possibility should be provided of obtaining energy for electric vehicles in public areas. In the ranges of electric vehicles currently available of between 50 and a few 100 km, it is appropriate for charging of the vehicles to be possible even outside the domestic environment. For this purpose, charging stations should be provided in public areas in order to provide constant availability of energy for electric vehicles by a supply network. This availability of electrical energy or of charging stations is a decisive criterion for the acceptance of electric vehicles.

It must be possible to bill the user of the charging station for the amount of energy procured during the charging process. In particular in charging stations which are installed in public areas and provide a charging possibility for an indeterminate number of electric vehicles, it is necessary for the user of the vehicle or the vehicle itself to be identified to the charging station so that the amount of energy obtained can be billed in a user-based manner. However, an identification of the vehicle itself, for example by means of a vehicle identifier, to the charging station is associated with the problem that this may make the vehicle traceable. However, such traceability of a vehicle is undesirable for a broad range of reasons.

For this reason, the subject matter was based on the object of providing an identification of electric vehicles that does not permit any conclusions to be drawn as to the vehicle itself.

SUMMARY OF THE INVENTION

According to the subject matter, this object is achieved by a method according to claim 1. In this case, a charging process is carried out on the vehicle side. This charging process is carried out at a charging station. At the beginning of or during a charging process, information about the charging process is emitted on the vehicle side. This information may for example be signalling to the charging station that the vehicle is ready for charging. In addition, a current contract key is received on the vehicle side after the emission on the vehicle side of the information about the charging process.

It has been recognised that not the identification of the vehicle itself, for example a chassis number or another identifier uniquely allocated to the vehicle, but rather a contract key is used for billing purposes in a charging process. A contract key may be a unique identifier. This may be a sequence of digits or numbers. The identifier can contain data digits and check digits. This identifier can be linked to a person, a contract or other contract-relevant data.

The use of the contract key ensures that the energy supplier's contractual partner is billed for the amount of energy procured. The user can sign a specific energy supply contract with the energy supplier and the contract key can be allocated to this energy supply contract. The contract key allows the user to be billed for the amount of energy procured. Billing is carried out in a user-based manner and a vehicle is no longer traceable.

In previous solutions, contract-based billing required a contract key to be input on the vehicle side or on the charging station side during each charging process. However, this input is time-consuming and cost-intensive. Either the input was carried out manually by the user himself, thus greatly reducing user convenience, or a contract identifier had to be automatically read by means of a reading apparatus, for example a card reading apparatus. However, this automatic reading greatly increases the costs of the charging station, as the appropriate electronics had to be provided for this purpose.

As a result of the fact that a current contract key is received on the vehicle side during preferably each charging process, it is possible to use this current contract key for subsequent charging processes. The billing centre can push the contract key to the vehicle, so that the vehicle can automatically receive and store the current contract key. The current, active contract key is thus stored in the vehicle at all times or updated at the beginning of, during or immediately after a charging process. If a contract key changes, then this change can be tracked by transmitting an altered contract key to the vehicle.

An embodiment proposes that a charging process be initiated on the vehicle side and that an item of information about the initiated charging process be emitted. The information about the initiated charging process may for example be the information of the vehicle of being ready for a charging process. On the vehicle side, this ensures that a billing centre is informed of any initiated charging process. This can also cause a contract key to be determined in the billing centre.

A current contract key can be determined in the centre after the reception of the information about the initiating of a charging process. According to an embodiment, this contract key can be emitted by the billing centre. Afterwards, this contract key can be received in the vehicle. This ensures that the vehicle contains a current contract key, via which subsequent billing can be carried out, after preferably each charging.

An embodiment also proposes that a vehicle-side memory be checked for the presence of a stored contract key and that, in the event of a negative check, the current, received contract key be written into the memory and be used as the stored contract key. In particular if no contract key is stored in the vehicle-side memory, the received current contract key can be stored and used as the stored contract key. This is advantageous in particular when a very first charging process is carried out.

Should no contract key yet be stored in the vehicle, for example during a very first charging, a corresponding item of information can be emitted on the vehicle side and received in a billing centre. This can for example be carried out in that no contract key is sent on the vehicle side, e.g. during emission of the information about the charging process.

In this case, in the billing centre the charging station, or the identification number thereof, may be known or be made known by the charging station at which a vehicle of this type charges. At the beginning of or during the charging process, the user can contact, for example by telephone, a customer centre and request a current contract key. The customer can thus express to the energy supplier his desire to conclude a contract with the energy supplier.

A current contract key can be allocated to this contract, which is not yet valid, as it has not been signed, and transmitted to the vehicle. The charging station, or the identification number thereof, can for example be used for transmitting to the vehicle. In this case, the customer can for example indicate the number of the charging station at which he is currently charging his vehicle, so that the contract key is pushed to the vehicle at this charging station. The identification number of the charging station can be used to address the data packet containing the current contract key.

In the billing centre, the current contract key can be taken from a database comprising a set of available contract keys. A pool of available contract keys can be stored in the database.

The contract is forwarded by post or in a different manner to the customer for him to sign. Before the contract has been signed, the current contract key is provisionally inoperative, but already stored in the vehicle. If the contract is now received signed at the energy supplier's premises, then the current contract key can be made operative. Thus, the initial charging process can be concluded with the creation of a current, operative contract key.

During a subsequent charging process, the current contract key can be used for billing. In this case, the vehicle can load the current contract key from a memory in the vehicle at the beginning of a charging process. This contract key can on the one hand be sent during the emission of the information about the charging process and on the other hand also be used for billing purposes, for example at the end of charging.

Should communication between the charging station and the billing centre be disturbed in this case, then the stored contract key can nevertheless be used for billing purposes. For this purpose, the current contract key can be used at the end of a charging process to confirm an amount of energy obtained.

If the contract is not signed and the customer nevertheless attempts to start a charging process, this charging process can be prevented. Thus, the provisionally inoperative contract key can for example be sent during the emission of the information about the charging process. This contract key can be used in the billing centre to ascertain that the charging process was requested without a valid contract. In this case, it would be possible to allow one, two or more charging processes with a provisionally inoperative contract key and to write to the customer again and remind him that his signature is required. The fact that it may not be possible to correctly bill a charging process of this type is accepted, as the costs of manually entering a current contract key before each charging process are much higher than the revenue that is lost when a single charging is not billed. A charging process can be denied once a maximum number of charging processes with a non-valid contract key has been exceeded.

It may occur that a vehicle checks in at a charging station with an invalid contract key, for example a contract key which has expired. In this case, this contract key can also be transmitted to a billing centre. The invalidity of the contract key can be ascertained in the billing centre. If a plurality of attempts to charge have been initiated using an invalid key of this type, the charging process can be terminated. If however a new, altered contract key should already be present in the billing centre, the new contract key can be determined. A history of contract keys can be stored in the billing centre. This history can be used to determine the contract key, which may have been altered, and to transmit it to the vehicle. In this case, a new current contract key is stored in the vehicle at the latest at the end of the charging process.

According to an embodiment, if a contract key is already stored in the vehicle-side memory, then this contract key is compared to the received contract key and, in the event of a positive check, the contract key stored in the vehicle-side memory remains unaltered. If, however, the stored contract key differs from the received contract key, then the stored contract key can be replaced by the received contract key.

An embodiment therefore proposes that, in the event of a negative comparison, in particular if the current contract key does not correspond to the stored contract key, the received current contract key be stored in the vehicle-side memory and be used as the stored contract key. The contract key previously stored in the memory can be deleted, displaced or marked as inactive.

This ensures that a current contract key is used in a subsequent charging process. Thus, subsequent charging is linked to a current contract key and billing can be carried out in a contract-based manner.

The respective storing of a current contract key ensures that a vehicle contains a current contract key at least after each charging. There is thus no need to maintain in a charging station a white list containing the allowed contract keys. As the current contract key is stored in the vehicle at all times, it is not absolutely essential to check the contract key before a charging process. This is advantageous in the event of disturbed communication between a charging station and a billing centre. In such a case, it would not be possible to check the contract key in the billing centre. As the current contract key is, however, stored in the vehicle, it is highly likely to be valid.

In order to be able to determine at all times an item of status information concerning a contract key, it is proposed that a current contract key having a key status be stored in a vehicle-side memory. In this case, a plurality of contract keys of various energy suppliers can for example be stored in a table. In this table, a status can be allocated to each contract key. This status may for example be "active" or "inactive". The current status can for example be determined by the billing centre and be transmitted to the vehicle together with the current contract key.

An embodiment proposes that at least one stored contract key and an item of information about an amount of energy obtained be emitted on the vehicle side. This information can be emitted at the end of a charging process. Information about a charging process can be assembled in a data packet. The data packet can comprise, in addition to a meter count, also a meter status, a meter identification, a charging station identification, an item of time information and/or a public measuring apparatus key.

With the aid of the stored contract key and the obtained amount of energy, it is possible to allocate the obtained amount of energy to a contract and to bill it.

An embodiment proposes that the current contract key contains a pair made up of a public contract key and a private contract key. In particular, the information transmitted in step b) can in this case be encrypted and/or signed by means of the private contract key. A signature can for example be carried out using a hash code. By means of the signature, it is possible to ensure data integrity and authenticity. In particular, it is possible to encrypt the hash code with the private contract key in order to obtain a cryptographic signature. In the billing centre, the integrity and authenticity of the received data can then be checked with the aid of the public contract key.

The terms "signature", "signing", etc. are used in the sense of an electronic, data-related signature. The electronic signing of the information for a charging process, for example in the form of a data packet, can also ensure that the data packet is not subsequently manipulated.

The charging station can also record, in addition to the amount of energy, at least an identification of the meter (counter, measuring apparatus). This may be an apparatus number. The identification of the meter may also be the additional identification of the charging station. A data packet is created with the aid of at least these values.

A data packet of this type can be signed electronically in the charging station. This allows the authenticity and integrity of the data packet to be checked. The electronically signed data packet can be transmitted to the electric vehicle.

The data packet received in the electric vehicle can also be supplemented in the vehicle by at least the contract key and signed in the vehicle with the contract key.

A signature can be calculated with the aid of a unique, preferably binary value created from the data packet and the contract key. A reference value, for example a hash code, can be calculated from the data packet. This reference value can also be used to calculate the signature. This signature can for example be calculated with the aid of the hash code and a stored contract key. A signature can also be calculated directly from the data packet and the contract key.

Signing may be creating a cryptogram as a signature with the aid of a preferably binary key, a preferably binary cryptogram being created with the aid of the key and the data packet to be signed or the reference value created therefrom. By means of a cryptogram of this type, it is possible to check whether the data packet was actually created by the charging station. For this purpose, a key which is known on the receiver side and matches the signature key can for example be used to calculate back from the signature the reference value or the data packet to be signed. For this purpose, a comparative reference value can for example be calculated on the receiver side, starting from the data packet. If the calculated reference value and comparative reference value correspond, data integrity may be assumed.

For example, a reference value can be calculated from payload data. A private key can be used to calculate a signature from this reference value. The signature can be sent to a receiver together with the payload data in a data container, as two separate files or embedded into the payload data. The receiver can calculate the reference value from the signature using a public key matching the private key. On the receiver side, a comparative reference value can likewise be calculated from the likewise received payload data. If the reference value and comparative reference value correspond, the integrity, authentication, authenticity of the payload data can be ensured.

The term "an electronic signature" may also refer to data which are linked to electronic information and can be used to identify the signer or signature producer and check the integrity of the signed electronic information. The electronic information is generally in the form of electronic documents. From a technical point of view, the electronic signature thus performs the same purpose as a personally signed signature on paper documents. An electronic signature can also comprise inter alia a digital signature. The digital signature can denote the purely data-related, cryptographic signature in which cryptographic, mathematical methods are applied. "Electronic signatures" may be data in electronic form that are added to other electronic data or logically linked thereto and are used for authentication.

If values change within the data packet during the transmission, then it is possible to ascertain on the receiver side, for example the billing centre, that the signature transmitted with the data packet does not match the received data packet and the data packet must have been altered. In the case of altered data, the comparison of the received signature with a calculated comparative signature or the comparison of a reference value with a comparative reference value produces a difference between these two values.

According to a further subject matter, a method is claimed for identifying an electric vehicle in a billing centre. In this case, information about a charging process is received from an electric vehicle on the billing centre side. On the billing centre side, a current contract key can be enabled and subsequently emitted. In the billing centre, it is possible to push a current contract key, meaning that the current contract key is automatically emitted in order to be able to be received in the vehicle.

An embodiment proposes that information about an initiated charging process be received on the billing centre side and that the current contract key be emitted after the reception of the information about the initiated charging process. It is also proposed that the current contract key be pushed to the vehicle.

A further subject matter is a device, in particular for carrying out an aforementioned method. The device has charging means configured for carrying out on the vehicle side a charging process at a charging station. The device also has communication means configured for emitting on the vehicle side an item of information about the charging process and for receiving on the vehicle side a current contract key after the emission on the vehicle side of the information about the charging process. Memory means configured for storing a current contract key are also provided. In addition, comparison means are provided for comparing a received current contract key to a stored contract key.

In addition, a system with an aforementioned device and a billing centre is claimed. The billing centre can have communication means configured for receiving information about a charging process from an electric vehicle and for emitting a current contract key. Processing means, configured for enabling a current contract key in the billing centre, may also be present.

The aforementioned methods can also be implemented as a computer program or as a computer program stored on a memory medium. In this case, a microprocessor can be suitably programmed on the vehicle side, on the charging station side and/or on the billing centre side for the carrying-out of the respective method steps by a computer program.

The features of the methods and devices are freely combinable with one another. In particular, features of the dependent claims may be independently inventive, bypassing the features of the independent claims, in isolation or freely combined with one another.

BRIEF DESCRIPTION OF THE INVENTION

The subject matter will be described hereinafter in greater detail with reference to drawings showing exemplary embodiments. In the drawings.

DETAILED DESCRIPTION OF THE INVENTION

Figure 1:
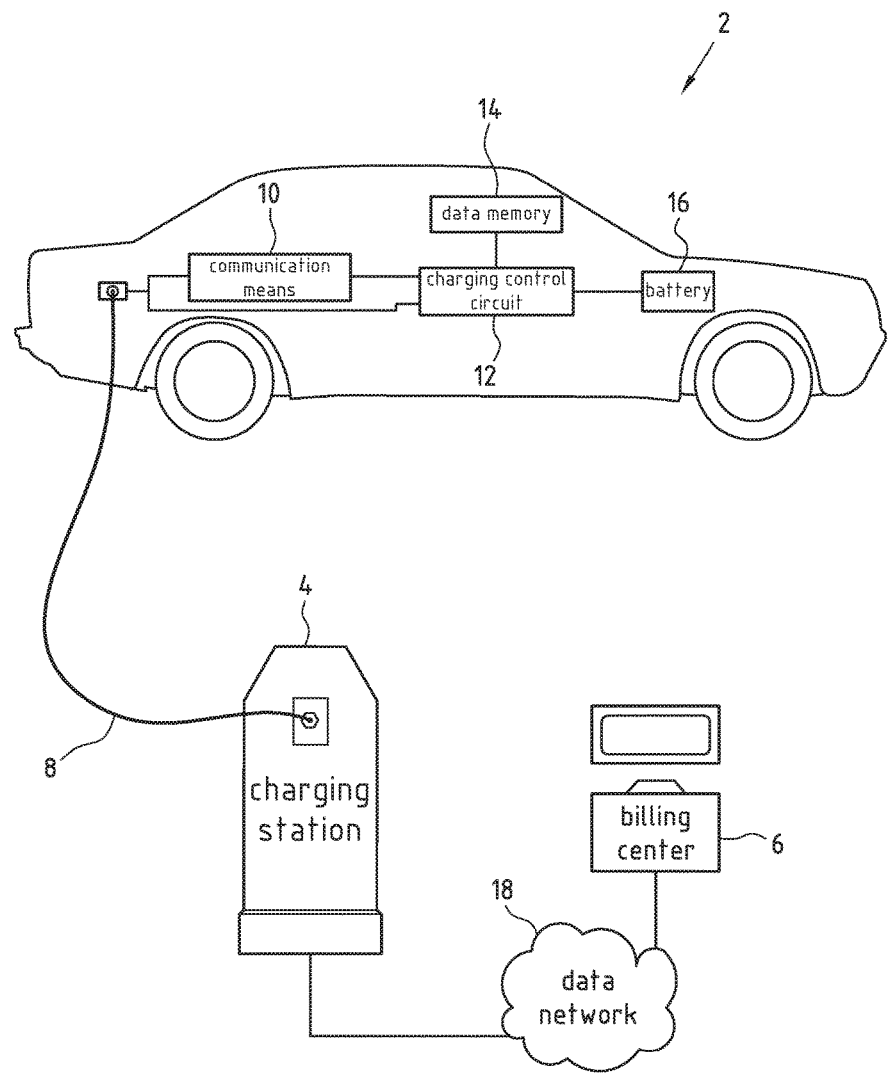
FIG. 1 shows schematically a construction of an exemplary embodiment of a system according to the subject matter.

FIG. 1 shows a system for carrying out a method according to the subject matter. The figure shows an electric vehicle 2, a charging station 4 and also a billing centre 6. The charging station 4 is connected to the vehicle 2 via a charging cable 8. Both electrical energy and information in the form of data packets can be exchanged between charging station 4 and electric vehicle 2 by means of the charging cable 8.

A communication means 10, which is connected at least to the data line of the charging cable 8, is arranged in the electric vehicle 2. In addition, a charging control circuit 12 and a data memory 14 are provided in the electric vehicle 2. The data memory can have both a rewritable memory and a non-rewritable memory. Finally, an electric battery 16 for powering an electric motor (not shown) is provided in the electric vehicle 2.

Figure 2:
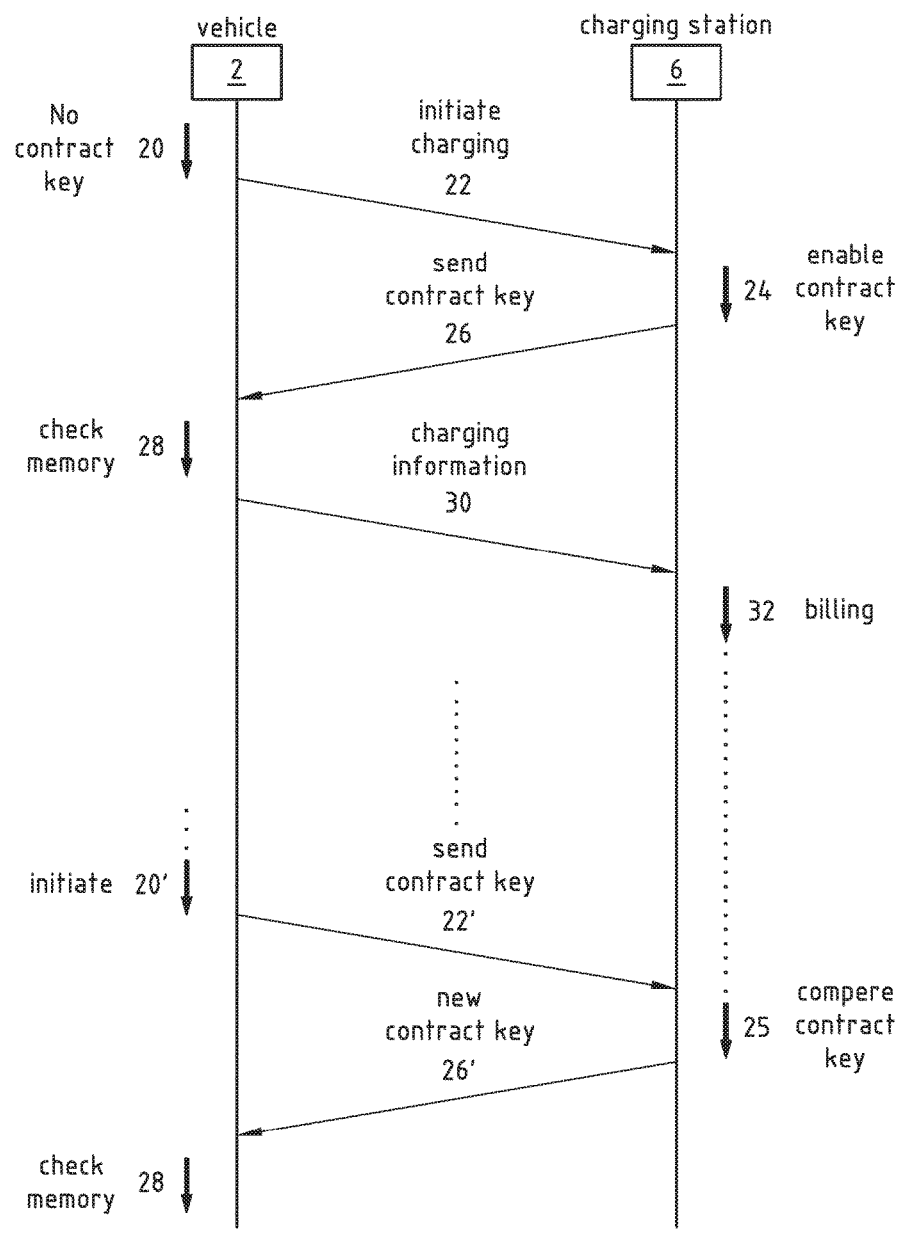
FIG. 2 is a message diagram corresponding to a method according to an advantageous exemplary embodiment during first charging and subsequent charging.

By means of the charging control circuit 12, the electrical energy procured from the charging station 4 via the charging cable 8 can be supplied to the battery 16 and the battery 16 can be charged up. The charging control circuit 12 can communicate with the charging station 4 via the charging cable 8 by means of the communication means 10. The data communicated in this way can be transmitted from the charging station 4 to the billing centre 6 via a data network 18. The billing centre 6 can likewise communicate with the electric vehicle 2 via the data network 18 and the charging station 4. For exchanging contract keys, the system is operated as described hereinafter:

FIG. 2 is a message diagram for carrying out a method according to the subject matter during a first charging process. At the beginning of a charging process, the process is initiated (20). In this case, the charging state of the battery 16 is determined in the electric vehicle 2 by means of the charging control circuit 12. In addition, charging parameters are exchanged with the charging station 4 via the charging cable 8.

Charging parameters may for example be the maximum current intensity, electricity rates, maximum amounts of energy, variable current intensities at specific times and the like.

The charging control circuit 12 communicates the charging parameters to the charging station 4 via the charging cable 8 by means of the communication means 10. Once the charging parameters have been successfully exchanged, a charging process can begin.

Once the charging parameters have been successfully negotiated, the charging station 4 enables the charging current via the charging cable 8 and the battery 16 can be charged.

Once the charging process has been successfully initiated (20), information about the initiation of the charging process is sent (22) from the vehicle 2 to the billing centre 6 via the charging station 4 and the data network 18.

During a first charging process, it may not yet be possible to identify the vehicle. A current contract key may not yet be stored in the memory 14. Both the rewritable memory and the non-deletable memory in the data memory 14 are empty.

During this very first charging process, no valid contract key is determined on initiation (20) of the charging process in the data memory 14 of the vehicle 2. Thus, no valid contract key is transmitted to the billing centre 6 during the emission (22) of the information about the initiating of the charging process.

In such a case, at the same time as the sending (22) of the information for example via a communication network, a user can make contact with the billing centre and request that a contract key be created.

Accordingly, a current contract key can be created in the billing centre. At the same time, an energy supply contract can be created in the billing centre and sent to the customer.

If the billing centre receives information about the initiating, a contract key is enabled (24), for example as described hereinbefore, in the billing centre 6. This can be carried out manually or automatically. With the enabling (24) of the contract key, this contract key is allocated to a specific energy supply contract. Contract parameters, such as costs per kWh, maximum current intensities, charging time restrictions and the like, can thus be retrieved via the contract key.

A copy of the contract is sent to the customer and the customer has to sign the contract in order to make it legally valid. If the energy supplier receives the signed contract, then the contract key, which was previously only provisionally operative, can actually be activated and be used for future billing of electricity procured.

The billing centre 6 emits the current contract key. The current contract key is received (26) in the vehicle 2. The vehicle then checks (28) by means of the charging control circuit 12 whether a contract key is stored in the data memory 14. As this is not the case during the first charging, the data memory 14 is filled with the received (26) current contract key. In this case, the current contract key can be stored in both the rewritable memory and the non-deletable memory.

In addition, the charging process can be concluded in step 28.

Once the charging process has been concluded, the charging control circuit 12 informs the charging station 4 of this, whereupon the charging station 4 cuts off the supply of energy to the vehicle 2 and energy can no longer be obtained via the charging cable 8. Subsequently, the charging control circuit 12 exchanges with the charging station 4 information about the amount of energy procured. This information can be exchanged in the form of data packets. Further information about the charging process may for example be a count of a measuring apparatus in the charging station 4, an identification of the charging station 4 and/or the identification of the measuring apparatus, a time stamp, a time index, a status of the charging station 4 and/or a status of the measuring apparatus, a starting count, an end count and/or the like.

For example, it is possible for the charging station 4 to transmit to the vehicle 2 the amount of energy procured. In the vehicle 2, the information about the amount of energy procured is encrypted and/or signed. The contract key stored in the data memory 14 is used for this purpose. This may for example be a private contract key. For example, a hash value can be generated from the information about the amount of energy procured. A cryptographic signature can be created from this hash value by means of the private contract key. The information thus signed about the charging process can be sent (30) from the vehicle 2.

In the billing centre 6, this information is received and used (32) for billing purposes. With the aid of a public contract key which is known in the billing centre 6, the signature can be checked and/or the received data can be decrypted.

During a subsequent charging process, the current contract key can be read from the data memory 14 on initiation (20') of the charging process. On initiation (20') of the charging process, the vehicle 2 can emit (22') this contract key and further information about the initiation of the charging process. This information is received in the billing centre 6 and the received information, in particular the received contract key, can be compared to the current contract keys in step 25. If a contract key has changed, for example as a result of a transfer of a contract or a change to a contract, the billing centre 6 can communicate this to the vehicle 2 in step 26' by sending a new, current contract key.

It is also possible to check whether a provisionally operative contract key is being used. If this is the case, the procurement of electricity can be interrupted or not enabled. A reminder can also be written to the customer in order to remind him to forward the signed contract. It is also possible to store the fact that the contract key was used in order in this way to prevent charging only if a third or fourth attempt at charging is made using the provisionally effective contract key.

It is also possible to store contract keys on a black list. A list of this type can store if appropriate all the contract keys for which the bill has not been paid or in which the associated charging process was defective, for example an excessively high current intensity was procured or a defective cable was used.

Figure 3:
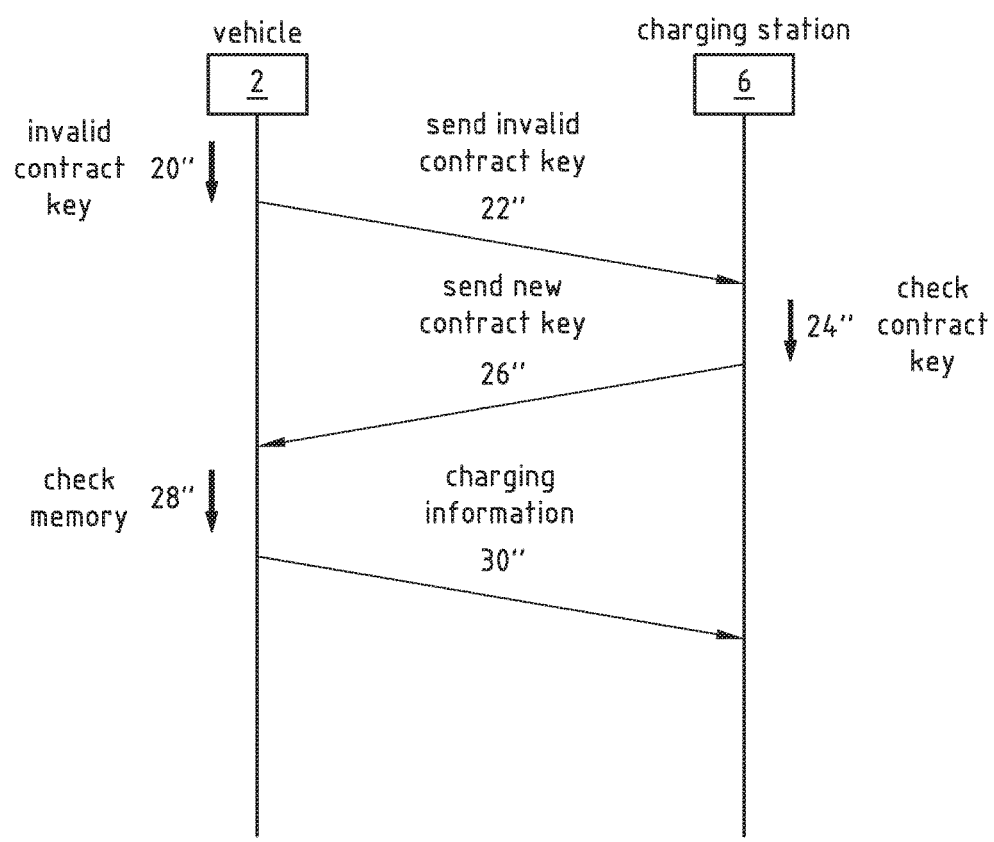
FIG. 3 is a message diagram corresponding to a method according to an advantageous exemplary embodiment during charging with an invalid contract key.

FIG. 3 is a message diagram in which an invalid contract key is used. In step 20" an invalid contract key is determined on initiation of the charging process. The invalid contract key can be transmitted to the billing centre 6 in step 22". At the billing centre 6, the contract key may be found to be invalid in step 24". In this case, a current contract key can for example be determined with the aid of the invalid contract key. This may for example be the case when a contract changes. If a current contract key can be determined, the current contract key can be transmitted to the vehicle 2 in step 26". It is then possible to proceed in steps 28" and 30" as in steps 28, 30. Otherwise, it is possible to prevent continuation of the charging process in step 26".

The transmission of a current contract key from the billing centre 6 to the vehicle 2 at the beginning of, during and/or at the end of each charging process ensures that the vehicle 2 contains a current contract key. It is also ensured that, at the latest after the first charging with an invalid contract key, further charging with a valid contract key is carried out. The automatic updating of the contract key eliminates the need to input a contract key manually. This reduces costs and allows contract-based billing. The electric vehicle cannot be traced by means of a vehicle identifier.

The invention claimed is:

1. Method for identifying an electric vehicle to a billing centre, comprising the steps of:
    a) initiating at the vehicle side a charging process at a charging station, wherein the charging process comprises providing a charging current to the electric vehicle by:
    b) emitting from the vehicle a piece of information about the vehicle being ready for receiving the charging current,
    c) initiating the charging current,
    d) checking if a first contract key is stored in the vehicle and:
        i) if the check for the first contract key is positive then the first contract key is emitted to the billing centre; and
        ii.) if the check for the first contract key is negative then a corresponding piece of information indicating the absence of the first contract key is emitted from the vehicle to the billing centre and a second contract key is emitted from the billing centre to the vehicle after providing the charging current to the vehicle;
            wherein the second contract key creates an encrypted and/or signed data packet including information about the charging process; and
            the encrypted and/or signed data packet is sent from the vehicle to the billing centre where it is used for billing purposes without the identity of the vehicle being traced by a vehicle identifier.

2. Method of claim 1, wherein the second contract key is written into and stored in a memory of the vehicle.

3. Method of claim 2, wherein a key status of the second contract key is stored in the memory of the vehicle.

4. Method of claim 1, wherein the first contract key remains stored in a memory of the vehicle.

5. Method of claim 1, wherein an item of information about an amount of energy procured during the charging process is emitted from the vehicle to the billing centre along with the first contract key.

6. Method of claim 1, wherein the encrypted and/or signed data packet is decrypted by the billing centre.

7. The method of claim 1, wherein the second contract key creates the encrypted and/or signed data packet with a private key.

8. The method of claim 7, wherein the encrypted and/or signed data packet is checked and/or decrypted at the billing centre with a public key that corresponds with the private key.

9. The method of claim 7, wherein the encrypted and/or signed data packet created is a cryptographic signature created from a hash value based on the amount of electrical current procured by the vehicle during the charging process.

10. Method for identifying an electric vehicle in a billing centre comprising the steps of:
    receiving on the billing centre side a piece of information about the vehicle being ready for receiving a charging current,
    checking if a first contract key is stored in the vehicle; and
        i) if the check for the first contract key is negative then:
            enabling the charging current,
            enabling a second contract key in the billing centre, and
            transmitting the second contract key from the billing centre to the vehicle, storing the second contract key in a memory of the vehicle;

creating a first encrypted and/or signed data packet with the second contract key including information about the charging process; and sending the first encrypted and/or signed data packet to the billing centre where it is used for billing purposes without the identity of the vehicle being traced by a vehicle identifier, and ii) if the check for the first contract key is positive then:

comparing the first contract key stored in the vehicle with a third contract key in the billing centre to determine if the information on the first contract key has changed, and emitting the third contract key from the billing centre to the vehicle if the information on the first contract key has changed; and storing the third contract key in the memory of the vehicle;

creating a second encrypted and/or signed data packet with the third contract key including information about the charging process; and sending the second encrypted and/or signed data packet from the vehicle to the billing centre where it is used for billing purposes without the identity of the vehicle being traced by a vehicle identifier.

11. Method of claim 10, wherein the second and third contract keys are emitted from the billing centre after the reception of the information about the initiated charging process is sent by the vehicle.

12. Method of claim 10, wherein the second and third contract keys are pushed to the vehicle by the billing centre.

13. The method of claim 10, wherein the second contract key creates the first encrypted and/or signed data packet using a first private key and the billing centre checks and/or decrypts the first encrypted and/or signed data packet with a first public key.

14. The method of claim 13, wherein the third contract key creates the second encrypted and/or signed data packet using a second private key and the billing centre checks and/or decrypts the second encrypted and/or signed data packet created with a second public key.

15. Device, in particular for carrying out a method according to claim 1, the device comprising:

a charger configured for initiating the charging process without emitting the first contract key from the vehicle, a communicator configured to emit the piece of information about the vehicle being ready for receiving the charging current and for receiving the second contract key emitted from the billing centre, a memory configured for storing the second contract key, and a comparator configured for comparing the second contract key to the first contract key.

16. System with a device of claim 15 further comprising: a billing centre having:

a communicator that is configured to receive the piece of information about the vehicle being ready for receiving the charging current and for emitting the second contract key, and a processor configured for enabling the second contract key.

17. Device, in particular for carrying out a method according to claim 10, the device comprising:

a charging means configured for carrying out a charging process at a charging station, a communication means configured for emitting an item of information about the charging process and for receiving the second and third contract keys after the emission of the item of information about the charging process, a memory means configured for storing the second and third contract keys, and a comparison means configured for comparing the third contract key to the first contract key.

18. Charging station, in particular for carrying out a method according to claim 1, with a charger configured to receive information about the vehicle being ready to receive the charging current and for providing the charging current to the vehicle without receiving the first contract key from the vehicle, a communicator emitting to the vehicle the second contract key after providing the charging current to the vehicle.

* * * * *